United States Patent
Patterson et al.

(10) Patent No.: US 6,932,314 B2
(45) Date of Patent: Aug. 23, 2005

(54) SLEEVES FOR USE IN SYSTEMS FOR SUPPORTING PLATFORM-LIKE OBJECTS ON CASTERS AND POSTS

(75) Inventors: Andrew W. Patterson, Falls Church, VA (US); Steven Snyder, Olney, MD (US); Magdalena Kotek, Raleigh, NC (US)

(73) Assignee: Beijing Trade Exchange, Inc., Washington, DC (US)

( * ) Notice: Subject to any disclaimer, the term of this patent is extended or adjusted under 35 U.S.C. 154(b) by 0 days.

(21) Appl. No.: 10/758,690

(22) Filed: Jan. 15, 2004

(65) Prior Publication Data
US 2005/0156086 A1 Jul. 21, 2005

(51) Int. Cl.[7] ............................................. A47B 91/00
(52) U.S. Cl. ................................ 248/346.11; 16/31 A
(58) Field of Search .................... 248/346.11, 188.8, 248/188.7; 403/373, 374.1, 365, 366, 368; 16/29, 44, 18, 37, 38, 31 R, 31 A; 108/107, 108/144.1

(56) References Cited

U.S. PATENT DOCUMENTS

| | | | | |
|---|---|---|---|---|
| 1,721,301 A | * | 7/1929 | Herold ........................... | 16/38 |
| 3,768,116 A | * | 10/1973 | Propst et al. ................... | 16/43 |
| 4,459,920 A | * | 7/1984 | Cwik ........................... | 108/107 |
| 4,699,344 A | * | 10/1987 | Vaughan ...................... | 248/170 |
| 4,731,900 A | * | 3/1988 | Frobose ......................... | 16/38 |
| 4,969,230 A | * | 11/1990 | Huang ........................... | 16/30 |
| 6,354,231 B1 | * | 3/2002 | Morris ................... | 108/144.11 |
| 6,810,561 B1 | * | 11/2004 | Liu ............................. | 16/42 T |

* cited by examiner

Primary Examiner—Ramon O. Ramirez
(74) Attorney, Agent, or Firm—John L. Welch, Esq.

(57) ABSTRACT

Sleeves for use in systems for supporting platform-like objects on casters and posts and described. The sleeves support caster-and-post junctions and inhibit deformation of the stems of the casters and the ends of posts in directions radially outward from the longitudinal axes of the stems and posts.

20 Claims, 6 Drawing Sheets

SLEEVES FOR USE IN SYSTEMS FOR SUPPORTING PLATFORM-LIKE OBJECTS ON CASTERS AND POSTS

BACKGROUND

A variety of systems are currently available for supporting platform-like objects, such as beds, dressers, and shelves, on casters and posts. In one type of system, the casters include wheels and elongated bolts attached to the wheels via brackets and the posts include inserts with threaded central apertures that are press-fit into the ends of the posts. In such a system, the casters are attached to the posts by screwing the bolts into the threaded central apertures of the inserts. Some of these systems lack strength in the caster-and-post junctions, which can result in deformation of the post ends in directions extending radially outward from the longitudinal axes of the posts during movement of the casters.

SUMMARY

Post-supporting sleeves and tapered supporting sleeves are described for use in systems for supporting platform-like objects on casters and posts.

In embodiments, a post-supporting sleeve can be configured to slidably couple a post to a caster. The post-supporting sleeve can include an inside diameter greater than an outside diameter of a post end. The post-supporting sleeve can include a first end, a second end, and an end piece coupled to the second end. The end piece can include a central opening having a diameter that is not less than a diameter of a central aperture of a post end. The post-supporting sleeve can be configured such that, when a post is inserted into a first end of the post-supporting sleeve so that the post end of the post contacts an end piece in the post end, and such that, when an elongated stem of a caster is inserted through a central opening in the end piece of the post-supporting sleeve and through a central aperture of a post end of a post so inserted into the post-supporting sleeve, the post-supporting sleeve supports the post end and inhibits deformation of the post end in a radially outward direction from the longitudinal axis of the post.

In embodiments, a tapered supporting sleeve can be configured to be coupled to the first end of a post-supporting sleeve and to frictionably couple a collar of a platform-like object to a post and a caster. The tapered supporting sleeve can include an inside diameter greater than an outside diameter of a post end. The tapered supporting sleeve can include a tapered outside diameter. The tapered supporting sleeve can be configured to be coaxially coupled to a post-supporting sleeve such that the outside diameter of the tapered supporting sleeve decreases from the junction of the tapered supporting sleeve with the post-supporting sleeve in a direction that extends from a caster to an attached post in an assembled caster-and-post junction, and such that, when a collar of a platform-like object is assembled onto and around the tapered supporting sleeve and a post inserted into the tapered supporting sleeve, the tapered supporting sleeve frictionably receives the collar.

The outer shape of the post-supporting sleeve can be one of substantially cylindrical, substantially oval, substantially semi-oval, and substantially polygonal. Regardless of the outer shape of the post-supporting sleeve, a central portion of the post-supporting sleeve can include a substantially cylindrical shape having an inside diameter greater than an outside diameter of a post end.

The post-supporting sleeve and the end piece can be integrally constructed. Alternatively, the post-supporting sleeve and the end piece can be attached to each other by one of an adhesive, a braise, a fastener, a press-fit, threads, and a weld.

The tapered outside diameter of the tapered supporting sleeve can include a taper ranging from approximately 3 degrees to approximately 5 degrees measured with respect to the axis of the tapered supporting sleeve.

When a tapered supporting sleeve is coupled to a post-supporting sleeve, the region of intersection can form a lip sized and shaped such that, when a collar of a platform-like object is assembled onto and around the tapered supporting sleeve and a post inserted into the tapered supporting sleeve and the post-supporting sleeve, the lip supports an end of the collar.

The post-supporting sleeve and the tapered supporting sleeve can be integrally constructed. Alternatively, the post-supporting sleeve and the tapered supporting sleeve can be attached to each other by one of an adhesive, a braise, a fastener, a press-fit, threads, and a weld.

The post-supporting sleeve and the tapered supporting sleeve can be constructed from a range of plastics, e.g., reinforced plastics, and metals, e.g., aluminum and steel.

The post-supporting sleeve and the tapered supporting sleeve can be used with caster-and-post junctions known to those of ordinary skill in the art, such as, but not limited to, non-threaded junctions and threaded junctions.

These and other features of the systems and methods described herein can be more fully understood by referring to the following detailed description and accompanying drawings. The drawings are not drawn to scale, but show only relative dimensions.

DETAILED DESCRIPTION

Figure 1:
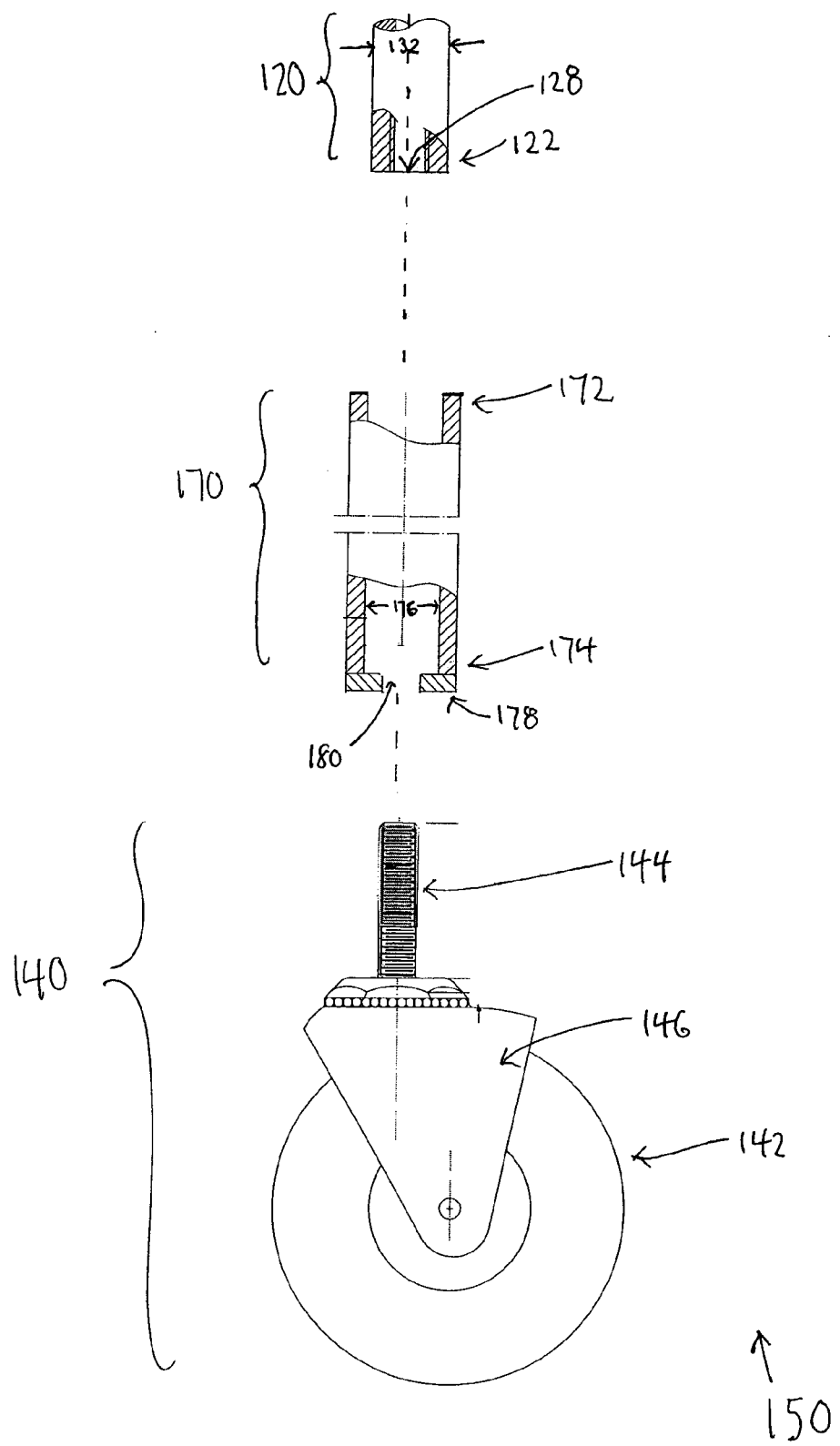
FIG. 1 is an exploded view of a threaded caster-and-post junction including an exemplary post-supporting sleeve for use in a system for supporting shelves on casters and posts.

Illustrative embodiments will now be described to provide an overall understanding of the disclosed sleeves. One or more examples of the embodiments are shown in the drawings. Those of ordinary skill in the art will understand that the disclosed sleeves can be adapted and modified to provide devices and systems for other applications, and that other additions and modifications can be made to the disclosed sleeves without departing from the scope of the present disclosure. For example, features of the embodiments can be combined, separated, interchanged, and/or rearranged to generate other embodiments. Such modifications and variations are intended to be included within the scope of the present disclosure.

The disclosed sleeves can be used to support caster-and-post junctions in systems that support platform-like objects on casters and posts. As used herein, the term platform-like objects refers to objects known by those of ordinary skill in the art to be supportable on casters and posts, such as, but not limited to, beds, dressers, and shelves. For purposes of illustration, the disclosed sleeves are described herein with respect to systems for supporting shelves on casters and posts. Those of ordinary skill in the art will understand, however, that the disclosed systems can be used in systems that support other types of platform-like objects on casters and shelves.

Generally, as used herein, the term stem refers to both non-threaded stems and threaded stems, i.e., bolts, unless otherwise indicated by context.

Figure 3:
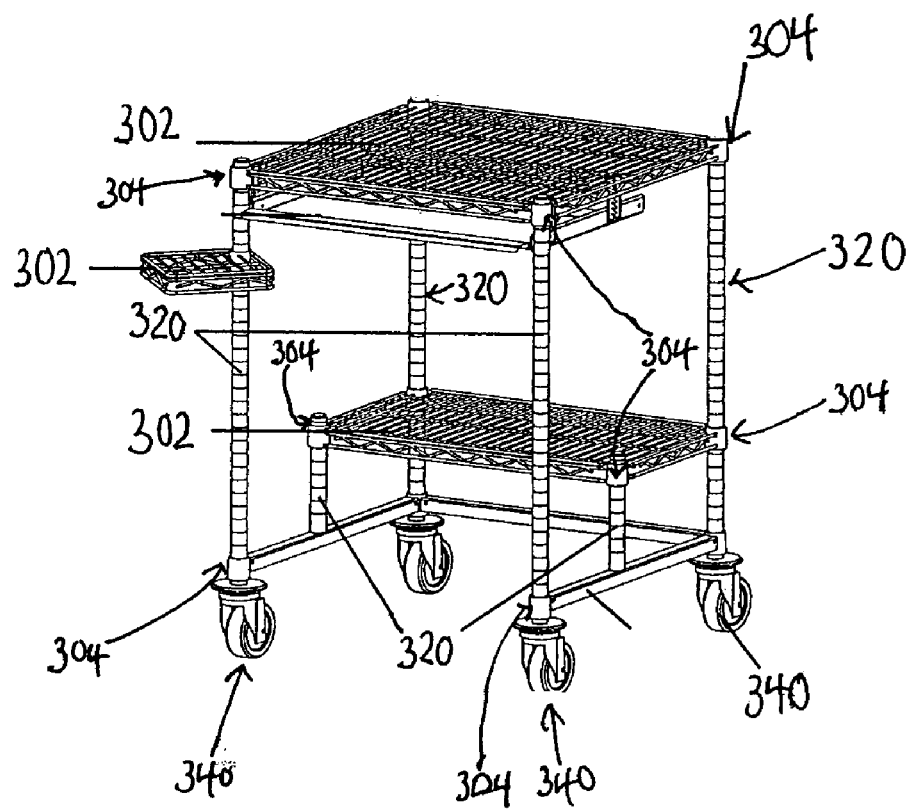
FIG. 3 is a perspective view of a system for supporting shelves on casters and posts.

FIG. 3 shows a system 300 for supporting shelves 302 on posts 320 and casters 340. As shown in FIG. 3, the casters 340 are attached to ends of the posts 320. As also shown in FIG. 3, the shelves 302 include shelf collars 304 into which the posts 320 are inserted, thereby attaching the shelves 302 to the posts 320. The caster-and-post junctions can include non-threaded junctions, threaded junctions, and other types of junctions known to those of ordinary skill in the art.

Figure 4:
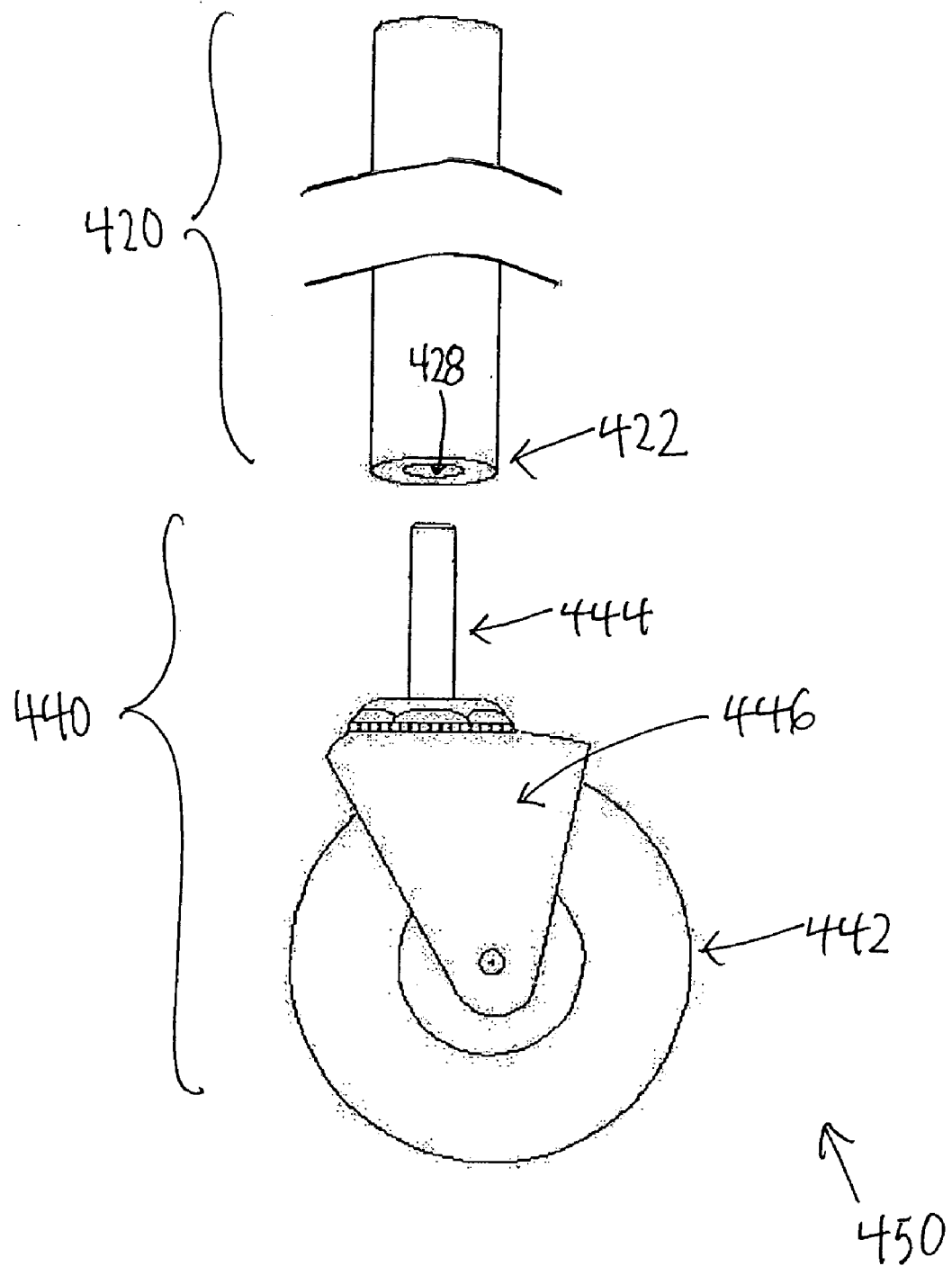
FIG. 4 is an exploded view of a non-threaded caster-and-post junction shown in FIG. 3.

FIG. 4 shows an exploded view of a non-threaded caster-and-post junction for the system 300 shown in FIG. 3. As shown in FIG. 4, the caster-and-post junction 450 includes a post 420 (shown in broken sections) and a caster 440 attached to the post 420. The post 420 includes a post end 422 having a central aperture 428. The caster 440 includes a wheel 442 and an elongated non-threaded stem 444 that is attached to the wheel 442 via a bracket 446 and that has a diameter less than the diameter of the central aperture 428. As shown in FIG. 4, the caster 440 can be attached to the post 420 by inserting the stem 444 through the central aperture 428 in the post end 422. The non-threaded stem 444 can be secured to the post end 422 by schemes known to those of ordinary skill in the art, such as, but not limited to, one or more rings, e.g., expansion rings or oversized rings.

Figure 5:
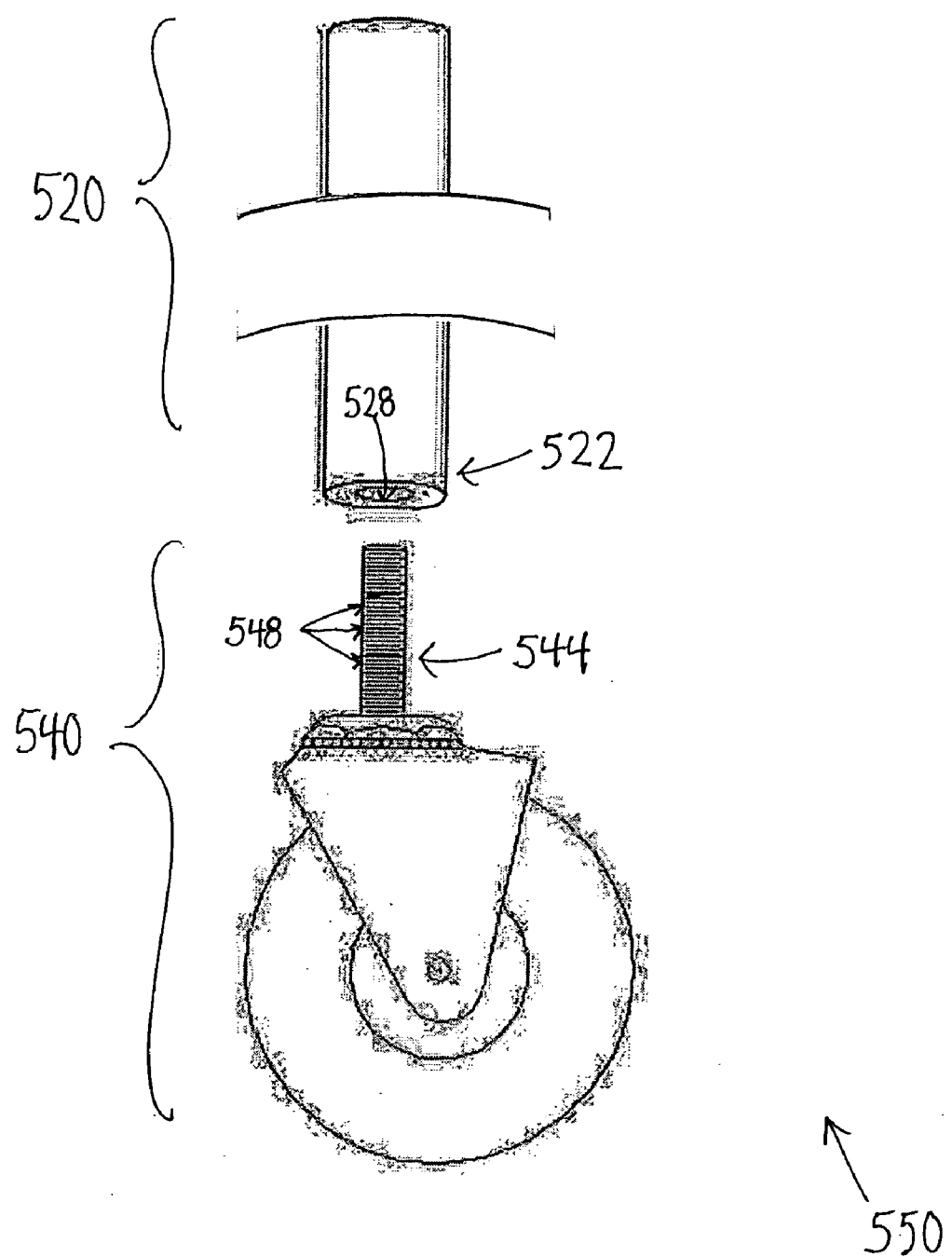
FIG. 5 is an exploded view of a threaded caster-and-post junction shown in FIG. 3.

FIG. 5 shows an exploded view of a threaded caster-and-post junction for the system 300 shown in FIG. 3. As shown in FIG. 5, the caster-and-post junction 550 includes a post 520 (shown in broken sections) and a caster 540 attached to the post 520. The post 520 includes a post end 522 that includes a central aperture 528 and threads surrounding the central aperture 528. As will be understood by those of ordinary skill in the art, the threaded central aperture 528 of the post end 522 can be provided by a threaded insert that is press-fit into or otherwise coupled to the post end 522 (e.g., via an adhesive, a braise, a mechanical fastener (e.g., nuts and bolts), and a weld). As also shown in FIG. 5, caster 540 includes an elongated threaded stem 544, i.e., a bolt 544, having threads 548 that are mated to the threads surrounding the central aperture 528. The caster 540 can be attached to the post 520 by inserting the bolt 544 through the central aperture 528 in the and screwing the bolt 544 into the threads of the central aperture 526.

As will be understood by those of ordinary skill in the art, the caster-and-post junctions 350, 450, and 550 shown and described with respect to FIGS. 3-5 lack strength, such that the post ends 322, 422, and 522 can deform in directions that extend radially outward from the longitudinal axes of the posts 320, 420, and 520 upon application of radial stresses to the caster-and-post junctions 350, 450, and 550 that can occur during movement of the casters 340, 440, 540.

FIG. 1 shows an exploded view of a threaded caster-and-post junction including an exemplary post-supporting sleeve for use in a system for supporting shelves on casters and posts. As shown in FIG. 1, the caster-and-post junction 150 includes a post 120 similar to the posts 320 and 520 of FIGS. 3 and 5, a caster 140 similar to the casters 340 and 540 of FIGS. 3 and 5, and an exemplary post-supporting sleeve 170 for coupling the post 120 to the caster 140. The post 120 includes a post end 122 that includes a central aperture 128 and threads surrounding the central aperture 128. In some embodiments, the threaded central aperture 128 can be provided by a threaded insert that is press-fit into or otherwise coupled to the post end 122, as will be understood by those of ordinary skill in the art. The caster 140 includes an elongate bolt 144 for attaching the caster 140 to the post 120.

As shown in FIG. 1, the post-supporting sleeve 170 includes a substantially cylindrical outer shape, a first end 172 for coupling to the post 120, and a second end 174 for coupling to the caster 140. The post-supporting sleeve 170 includes an inside diameter 176 that is greater than the outside diameter 132 of the post end 122. In some embodiments, the inside diameter 176 can be sized with respect to the outside diameter 132 such that the post end 122 can be slidably, i.e., removeably and replaceably, inserted into the post-supporting sleeve 170 through the first end 172. Alternatively, in some embodiments, the inside diameter 176 can be sized with respect to the outside diameter 132 such that the post end 122 can be press-fit, i.e., frictionably inserted, into the post-supporting sleeve 170 through the first end 172. The post-supporting sleeve 170 includes an end piece 178 that is coupled to the second end 174 of the post-supporting sleeve 170 and that includes a central opening 180. The central opening 180 is sized and shaped to removeably and replaceably receive the bolt 144 of the caster 140. Preferably, the central opening 180 has a size and a shape substantially similar to that of the central aperture 128 in the post end 122.

In some embodiments, the post 120, the caster 140, and the post-supporting sleeve 170 are assembled in two steps. For example, as indicated in FIG. 1, the post 120 can be inserted into the post-supporting sleeve 170 via the first end 172 until the post end 122 contacts the end piece 178, i.e., until the adjacent surfaces of the post end 122 and the end piece 178 substantially abut each other. With the post end 122 so inserted into the post-supporting sleeve 170, the bolt 144 of the caster 140 can be inserted through the central opening 180 of the end piece 178 and screwed into the internal threads of the post end 122. In such a configuration, the post-supporting sleeve 170 supports the post end 122 and inhibits deformation of the post end 122 in radially outward directions from the longitudinal axis of the post 120.

Alternatively and/or in combination, in some embodiments, the post 120, the caster 140, and the post-supporting sleeve 170 are assembled in a different sequence of steps. For example, in one such embodiment, the bolt 144 can be inserted through the central opening 180 in the end piece 178 so that the post-supporting sleeve 170 rests on the caster 140, and the post end 122 can be threaded onto the bolt 144.

As will be understood by those of ordinary skill in the art, the post-supporting sleeve 170 can include a variety of outer shapes. For example, in some embodiments, the post-supporting sleeve 170 can include outer shapes that are substantially oval (e.g., spherical), substantially semi-oval (e.g., hemispherical), and substantially polygonal (e.g., square), with such examples being provided for illustration and not limitation. In such embodiments, the post-supporting sleeve 170 includes a substantially cylindrical central portion sized and shaped for receiving the post end 122 as previously described with respect to FIG. 1.

In some embodiments, the post-supporting sleeve 170 and the end piece 178 can be integrally constructed. Alternatively, in other embodiments, the post-supporting sleeve 170 and the end piece 178 can be attached to each other via an adhesive, a braise, a mechanical fastener (e.g., nuts and bolts), a press-fit, threads (e.g., the sleeve 170 and the end piece 178 can include mated threads), a weld, and/or other schemes known to those of ordinary skill in the art.

The post-supporting sleeve 170 and the end piece 178 can be constructed from a range of plastics and metals. For example, in some embodiments, the post-supporting sleeve 170 and the end piece 178 can be constructed from molded plastic, reinforced plastic, aluminum, and steel.

Figure 2A:
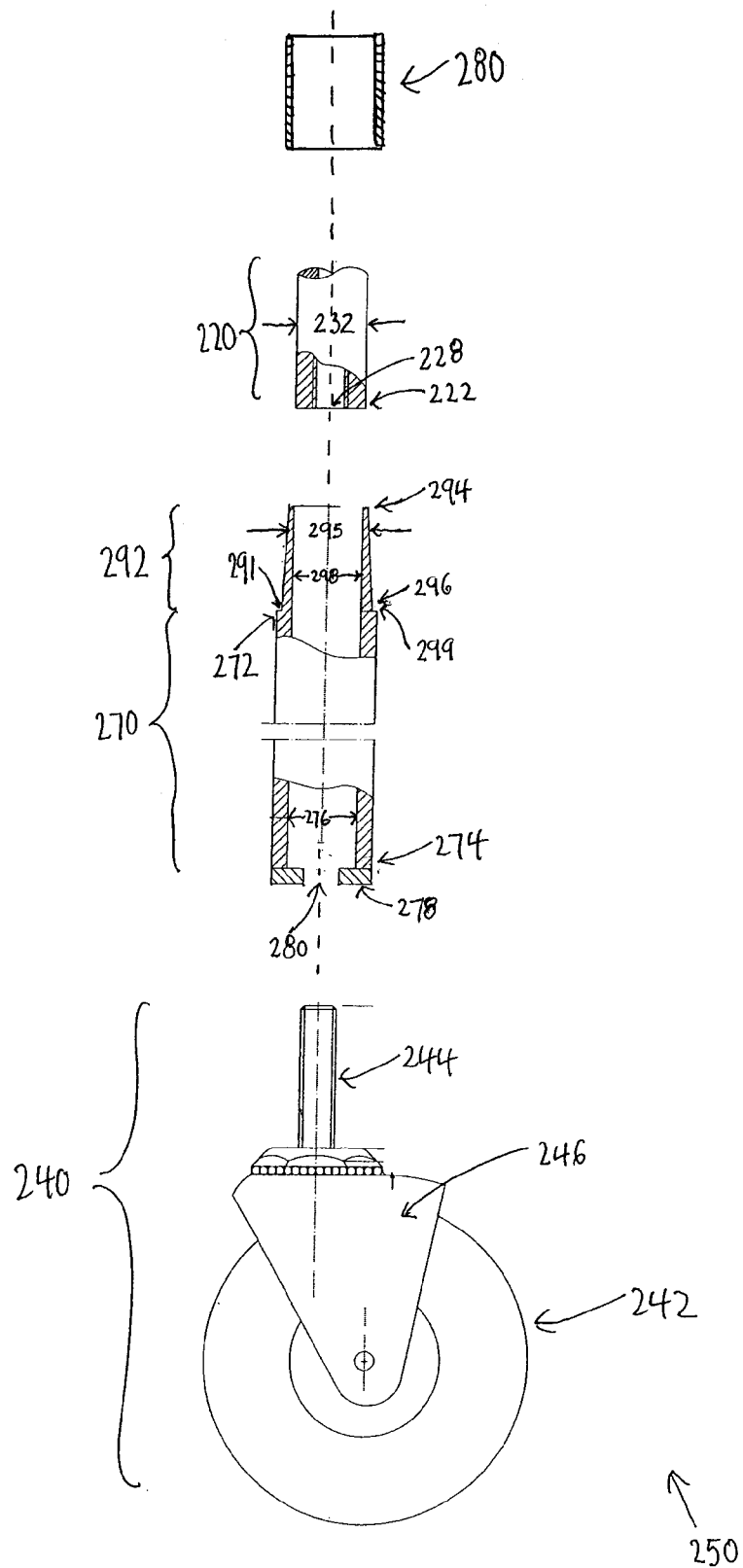
FIG. 2A is an exploded view of a non-threaded caster-and-post junction including an exemplary post-supporting sleeve and an exemplary tapered supporting sleeve coupled thereto for supporting shelves on casters and posts.

FIG. 2A shows an exploded view of a non-threaded caster-and-post junction including an exemplary post-supporting sleeve and an exemplary tapered supporting sleeve coupled thereto for use in a system for supporting shelves on posts and casters. As shown in FIG. 2A, the caster-and-post junction 250 includes a post 220 similar to the posts 320 and 420 of FIGS. 3 and 4, a caster 240 similar to the casters 340 and 440 of FIGS. 3 and 4, an exemplary post-supporting sleeve 270 similar to the post-supporting sleeve 170 of FIG. 1, and an exemplary tapered supporting sleeve 292 coupled to the post-supporting sleeve 270. The post 220 includes a post end 222 having a central aperture 228, and the caster 240 includes an elongate non-threaded stem 244 for attaching the caster 240 to the post 220.

As shown in FIG. 2A, the tapered supporting sleeve 292 includes a tapered outer shape, a first end 294 for coupling to the post 220, and a second end 296 for coupling to the post-supporting sleeve 270. Similar to the post-supporting sleeve 270, the tapered supporting sleeve 292 includes an inside diameter 298 that is greater than the outside diameter 232 of the post end 222. In some embodiments, the inside diameter 298 can be sized with respect to the outside diameter 232 such that the post end 222 can be slidably inserted into the tapered supporting sleeve 292 through the first end 294. Alternatively, in some embodiments, the inside diameter 298 can be sized with respect to the outside diameter 232 such that the post end 222 can be press-fit into the tapered supporting sleeve 292 through the first end 294.

As shown in FIG. 2A, the tapered supporting sleeve 292 is coupled at its second end 296 to the first end 272 of the post-supporting sleeve 270. The tapered supporting sleeve 292 is coaxially coupled to the post-supporting sleeve 270, i.e., the tapered supporting sleeve is coupled to the post-supporting sleeve 270 such that the longitudinal axis of the tapered supporting sleeve 292 is coaxial with the longitudinal axis of the post-supporting sleeve 270. The tapered supporting sleeve 292 includes a tapered outside diameter 295 that decreases in a direction extending from the second end 296 of the tapered supporting sleeve 292 to the first end 294 of the tapered supporting sleeve 292. In other words, the tapered outside diameter 295 decreases from the junction of the tapered supporting sleeve 292 with the post-supporting sleeve 270 in a direction that extends from the caster 240 to the attached post 220 in the assembled caster-and-post junction 250. The tapered outside diameter 295 of the tapered supporting sleeve 292 is sized and shaped so that a shelf collar can be press-fit onto and around the tapered supporting sleeve 292. In some embodiments, the tapered outside diameter 295 can include a taper measured with respect to the longitudinal axis of the tapered supporting sleeve 292 ranging from approximately 1 degree to approximately 10 degrees and, preferably, from approximately 3 degrees to approximately 5 degrees. The region of intersection 299 of the tapered supporting sleeve 292 and the post-supporting sleeve 270 forms a lip 291 that extends around the second end 296 of the tapered supporting sleeve 292.

Figure 2B:
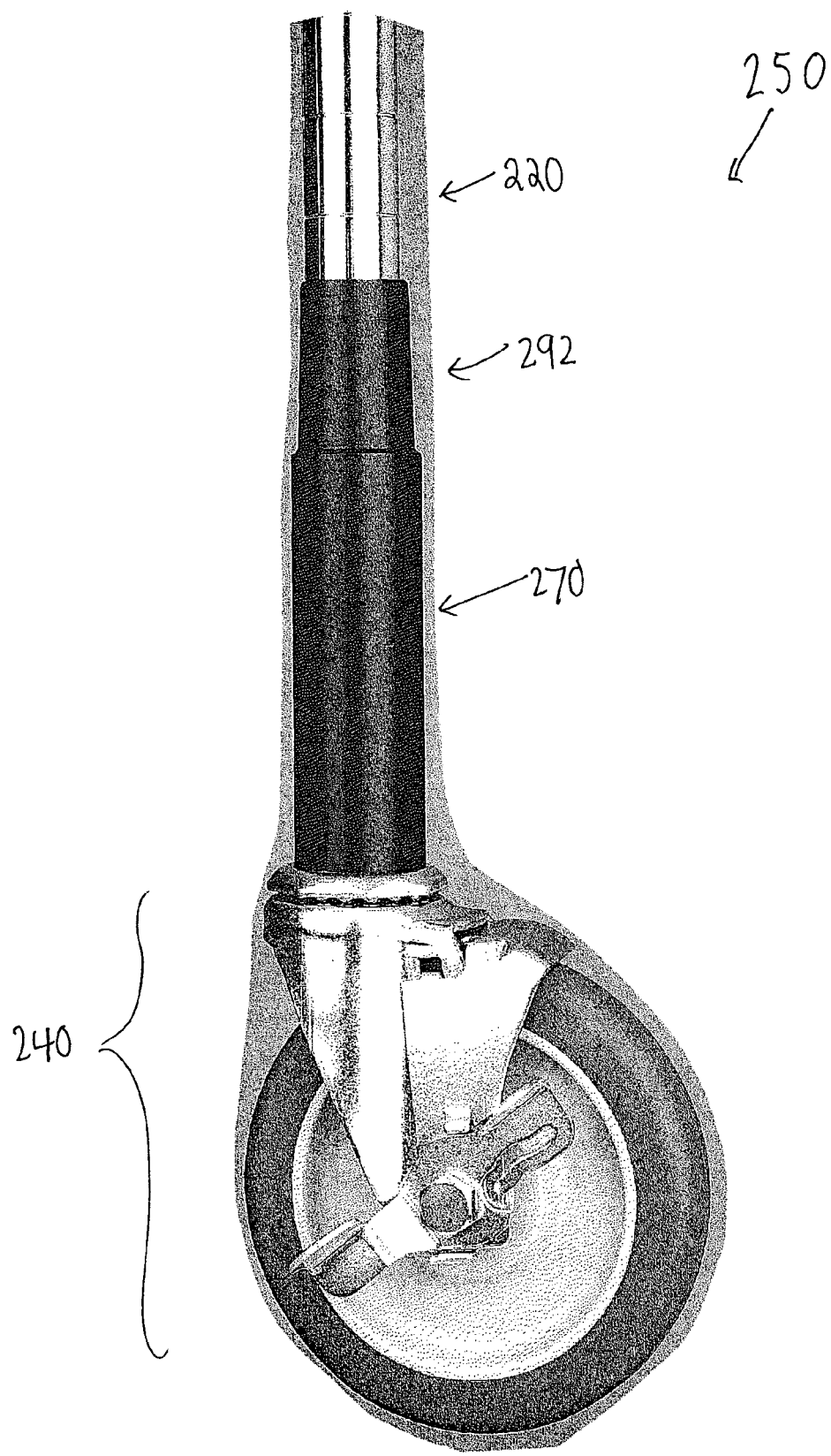
FIG. 2B is an assembled view of the non-threaded caster-and-post junction shown in FIG. 2A.

In some embodiments, the post 220, the caster 240, and the exemplary sleeves 270, 292 can be assembled in two steps. As shown in FIG. 2A, the post 220 can be inserted into the tapered supporting sleeve 292 via its first end 294 and into the post-supporting sleeve 270 via its first end 272 until the post end 222 contacts the end piece 278. With the post end 222 so inserted into the exemplary sleeves 270, 292, the stem 244 of the caster 240 can be inserted through the central opening 280 of the end piece 278 and into the central aperture 228 in the post end 222. In such a configuration, the exemplary sleeves 270, 292 support the post end 222 and inhibit deformation of the post end 222 in radially outward directions from the longitudinal axis of the post 220. FIG. 2B shows an assembled view of the caster-and-post junction 250 shown in FIG. 2A.

Alternatively and/or in combination, in some embodiments, the post 220, the caster 240, and the exemplary sleeves 270, 292 are assembled in a different sequence of steps. For example, in one such embodiment, the stem 244 can be inserted through the central opening 280 in the end piece 278 so that the post-supporting sleeve 270 rests on the caster 240, and the post end 222 can be disposed into the tapered supporting sleeve 292 and onto the stem 244.

As shown in FIG. 2A, a shelf collar 280 of a shelf (such as a shelf collar 304 of a shelf 302 shown in FIG. 3) can be disposed onto and around the assembled caster-and-post junction 250. For example, the shelf collar 280 can be press-fit onto and around the tapered supporting sleeve 292 until the shelf-collar 280 contacts the lip 291, i.e., until adjacent surfaces of the shelf collar 280 and the lip 291 substantially abut each other. As will be understood by those of ordinary skill in the art, in some embodiments, the shelf collar 280 may not contact the lip 291 when assembled onto the tapered supporting sleeve 292 because the tapered outside diameter 295 inhibits motion of the shelf collar 280 when the tapered outside diameter 295 approaches or exceeds the inside diameter of the shelf collar 280. The lip 291 thus provides a limit on the motion of the shelf collar 280. In such a configuration, the tapered supporting sleeve 292 permits a shelf collar 280 and, thus, a shelf to be mounted on a post 220 at a relatively low height with respect to a caster 240.

In some embodiments, the post-supporting sleeve 270 and the tapered supporting sleeve 292 can be integrally constructed. For example, in some embodiments, the sleeves 270, 292 can be integrally constructed by providing a cylindrical tube, associating a first portion of the tube with the post-supporting sleeve 270, associating a second contiguous portion of the tube with the tapered supporting sleeve 292, and lathing the second portion of the tube to form the tapered outside diameter 295 of the tapered supporting sleeve 292. Alternatively, in other embodiments, the post-supporting sleeve 270 and the tapered supporting sleeve 292 can be attached via an adhesive, a braise, a mechanical fastener (e.g., nuts and bolts), a press-fit, threads, a weld, and/or another schemes known to those of ordinary skill in the art.

The tapered supporting sleeve 292 can be constructed from a range of plastics and metals. For example, in some embodiments, the tapered supporting sleeve 292 can be constructed from molded plastic, reinforced plastic, aluminum, and steel. In some embodiments, the sleeves 270, 292 can be integrally constructed from steel or reinforced plastic.

As will be understood by those of ordinary skill in the art, the sleeves 170, 270, and 292 can support threaded caster-and-post junctions (e.g., junctions like junction 150 of FIG. 1), non-threaded caster-and-post-junctions (e.g., junctions like junction 250 in FIG. 2A), and other types of caster-and-post junctions known to those of ordinary skill in the art.

Those of ordinary skill in the art will recognize or be able to ascertain many equivalents to the exemplary embodiments described herein by using no more than routine experimentation. Such equivalents are intended to be encompassed by the scope of the present disclosure and the appended claims.

For example, the disclosed post-supporting sleeves and tapered supporting sleeves can support post ends in caster-and-post junctions known to those of ordinary skill in the art, and are not limited to supporting post ends in non-threaded and threaded caster-and-post junctions.

Also for example, the disclosed post-supporting sleeves and tapered supporting sleeves can be used to support collars of platform-like objects known to those of ordinary skill in the art, and are not limited to supporting collars of shelves.

Accordingly, the appended claims are not to be limited to the embodiments described herein, can include practices other than those described, and are to be interpreted as broadly as allowed under prevailing law.

What is claimed is:

1. A caster-post-and-sleeve assembly use in a system supporting platform-like objects on posts, the caster-post-and-sleeve assembly comprising:
    a caster including a wheel and an elongated stem attached to the wheel, the stem being inserted into a central aperture of a post end of a post for attaching the caster to the post, and
    a post-supporting sleeve slidably coupling the post to the caster, the post-supporting sleeve including an inside diameter greater than an outside diameter of a post end, the post-supporting sleeve further including a first end, a second end, and an end piece coupled to the second end, the end piece having a central opening therein, the diameter of the central opening being not less than the diameter of the central aperture of the post end, such that, when the post is inserted into the first end of the post-supporting sleeve the post end of the post contacts the end piece, and such that when the elongated stem of the caster is inserted through the central opening in the end piece of the post-supporting sleeve and through a central aperture of the post end of the post so inserted into the post-supporting sleeve, the post-supporting sleeve supports the post end and inhibits deformation of the post end in a radially outward direction from the longitudinal axis of the post.

2. The caster-post-and-sleeve assembly of claim 1, further comprising:
    a tapered supporting sleeve coupled to the first end of the post-supporting sleeve and to frictionably couple a collar used with the platform-like objects to the post and the caster, the tapered supporting sleeve including an inside diameter greater than the outside diameter of a post end and a tapered outside diameter, the tapered supporting sleeve coaxially coupled to the post-supporting sleeve such that the outside diameter of the tapered supporting sleeve decreases from the junction of the tapered supporting sleeve with the post-supporting sleeve in a direction that extends from the caster to the attached post in the assembled caster-and-post junction, and such that when the collar is assembled onto and around the tapered supporting sleeve and the post inserted into the tapered supporting sleeve and the post-supporting sleeve, the tapered supporting sleeve frictionably receives the collar.

3. The system caster-post-and-sleeve assembly of claim 1, wherein the stem includes a bolt having threads, and wherein the central aperture of the post end includes internal threads surrounding the central aperture, such that when the bolt is inserted through the central opening in the end piece of the post-supporting sleeve and screwed into the internal threads of the central aperture of the post end of the post inserted into the post-supporting sleeve, the post-supporting sleeve supports the post end and inhibits deformation of the post end in a radially outward direction from the longitudinal axis of the post.

4. A sleeve assembly for use in a system supporting a post and a caster used with platform-like objects, in which the post includes a post end with a central aperture therein, and in which the caster includes a wheel and an elongated stem attached to the wheel, the stem being inserted into the central aperture of the post end attaching the caster to the post, the sleeve assembly comprising:
    a post-supporting sleeve slidably coupling the post to the caster, the post-supporting sleeve including an inside diameter greater than an outside diameter of the post end, the post-supporting sleeve including a first end, a second end, and an end piece coupled to the second end, the end piece having a central opening therein, the diameter of the central opening being not less than the diameter of a central aperture of the post end, such that when the post is inserted into the first end of the post-supporting sleeve the post end of the post contacts the end piece, and such that when the elongated stem of the caster is inserted through the central opening in the end piece of the post-supporting sleeve and through the central aperture of the post end of the post so inserted into the post-supporting sleeve, the post-supporting sleeve supports the post end and inhibits deformation of the post end in a radially outward direction from the longitudinal axis of the post, and
    a tapered supporting sleeve coupled to the first end of the post-supporting sleeve and to frictionably couple a collar used with the platform-like objects to the post and the caster, the tapered supporting sleeve including an inside diameter greater than the outside diameter of the post end, the tapered supporting sleeve including a tapered outside diameter, the tapered supporting sleeve coaxially coupled to the post-supporting sleeve such that the outside diameter of the tapered supporting sleeve decreases from the junction of the tapered supporting sleeve with the post-supporting sleeve in a direction that extends from the caster to the attached post in the assembled caster-and-post junction, and such that when the collar is assembled onto and around the tapered supporting sleeve and the post inserted into the tapered supporting sleeve and the post-supporting sleeve, the tapered supporting sleeve frictionably receives the collar.

5. The assembly of claim 4, wherein the outer shape of the post-supporting sleeve includes one of: substantially cylindrical, substantially oval, substantially semi-oval, and substantially polygonal, and wherein a central portion of the post-supporting sleeve includes a substantially cylindrical shape having an inside diameter greater than the outside diameter of the post end.

6. The assembly of claim 4, wherein the post-supporting sleeve and the end piece are attached to each other by one of an adhesive, a braise, a fastener, threads, a press-fit, and a weld.

7. The assembly of claim 4, wherein the post-supporting sleeve and the end piece are integrally constructed.

8. The assembly of claim 4, wherein the tapered supporting sleeve and the post-supporting sleeve are attached to each other by one of an adhesive, a braise, a fastener, threads, a press-fit, and a weld.

9. The assembly of claim 4, wherein the tapered supporting sleeve and the post-supporting sleeve are integrally constructed.

10. The assembly of claim 4, wherein at least one of the post-supporting sleeve and the tapered supporting sleeve is constructed from at least one of: a plastic and a metal.

11. The assembly of claim 4, wherein the post-supporting sleeve and the tapered supporting sleeve are integrally constructed from one of steel and reinforced plastic.

12. The assembly of claim 4, wherein when the tapered supporting sleeve is coupled to the post-supporting sleeve, the intersection forms a lip sized and shaped such that when the collar is assembled onto and around the tapered supporting sleeve and the post inserted into the tapered supporting sleeve and the post-supporting sleeve, the lip supports an end of the collar.

13. The assembly of claim 4, wherein the tapered outside diameter of the tapered supporting sleeve includes a taper ranging from approximately 3 to approximately 5 degrees measured with respect to the axis of the tapered supporting sleeve.

14. The assembly of claim 4, wherein the stem of the caster includes a bolt having threads, the post end of the post includes threads surrounding the central aperture in the post end, such that when the bolt is inserted through the central opening in the end piece of the post-supporting sleeve and screwed into the internal threads of the post end of the post inserted into the post-supporting sleeve, the post-supporting sleeve supports the post end and inhibits deformation of the post end in a radially outward direction from the longitudinal axis of the post.

15. The assembly of claim 14, wherein the post includes an insert that has a threaded central aperture and that is press-fit into the post end.

16. A post-supporting sleeve use in a system supporting a post and a caster used with platform-like objects, wherein the post includes a post end with a central aperture therein, and wherein the caster includes a wheel and an elongated stem attached to the wheel, the stem being inserted into the central aperture of the post end of the post for attaching the caster to the post, the outer diameter of the stem being not less than the diameter of the central aperture, the post-supporting sleeve including:

a first end, a second end, and an end piece coupled to the second end, the most-supporting sleeve having an inside diameter greater than the outside diameter of the post end, wherein the post-supporting sleeve is slidably coupling the post to the caster, and wherein the end piece includes a central opening, the diameter of the central opening being not less than the diameter of a central aperture of the post end, such that when the post is inserted into the first end of the post-supporting sleeve the post end of the post contacts the end piece, and such that when the elongated stem of the caster is inserted through the central opening in the end piece of the post-supporting sleeve and through the central aperture of the post end of the post, the post-supporting sleeve supports the post end and inhibits deformation of the post end in a radially outward direction from the longitudinal axis of the post.

17. The post-supporting sleeve of claim 16, wherein the stem of the caster includes a bolt having threads, the post end of the post includes threads surrounding the central aperture in the post end, wherein the bolt threads of the bolt are mated to the internal threads of the post end such that when the bolt is inserted through the central opening in the end piece of the post-supporting sleeve and screwed into the internal threads of the post end of the post, the post-supporting sleeve supports the post end and inhibits deformation of the post end in a radially outward direction from the axis of the bolt.

18. A method for supporting a platform-like object, the method comprising:

providing posts for supporting the object, each post including a post end with a central aperture therein, providing casters, each caster including a wheel and an elongated stem attached to the wheel, the stem configured for being inserted into a central aperture of a post end of a post for attaching the caster to the post, providing post-supporting sleeves, each post-supporting sleeve configured to slidably couple a post to a caster, the post-supporting sleeve including an inside diameter greater than an outside diameter of a post end, the post-supporting sleeve including a first end, a second end, and an end piece coupled to the second end, the end piece having a central opening therein, the diameter of the central opening being not less than the diameter of a central aperture of a post end, such that, when a post is inserted into the first end of the post-supporting sleeve so that the post end of the post contacts the end piece, and such that, when the elongated stem of a caster is inserted through the central opening in the end piece of the post-supporting sleeve and through a central aperture of a post end of a post inserted into the post-supporting sleeve, the post-supporting sleeve supports the post end and inhibits deformation of the post end in a radially outward direction from the longitudinal axis of the post, mounting the object on the posts, inserting the post ends into the first ends of the post-supporting sleeves, such that the post ends contact the end pieces, and inserting the stems through the central openings in the post-supporting sleeves and through the central apertures in the end pieces of the post ends disposed in the post-supporting sleeves, thereby attaching the casters to the posts.

19. The method of claim 18, wherein mounting the object on the posts includes:

inserting the posts through collars of the object.

20. The method of claim 18, further comprising:

providing tapered supporting sleeves, each tapered supporting sleeve configured to be coupled to the first end of a post-supporting sleeve and to frictionably couple a collar of the object to a post to a caster, the tapered supporting sleeve including an inside diameter greater than the outside diameter of a post end, the tapered supporting sleeve including a tapered outside diameter, the tapered supporting sleeve configured to be coaxially coupled to a post-supporting sleeve such that the outside diameter of the tapered supporting sleeve decreases from the junction of the tapered supporting sleeve with the post-supporting sleeve in a direction that extends from a caster to an attached post in an assembled caster-and-post junction, the tapered supporting sleeve and the post-supporting sleeve forming a lip in their region of intersection when coupled to each other, such tat, when a collar is assembled onto and around the tapered supporting sleeve and a post inserted into the tapered supporting sleeve and the post-supporting sleeve, the tapered supporting sleeve frictionably receives the collar and the lip supports an end of the collar, and wherein mounting the object on the posts further includes disposing the collars of the object so as to rest on the supporting lips of the tapered supporting sleeves.

* * * * *